US008589103B2

(12) United States Patent
Matsubara et al.

(10) Patent No.: US 8,589,103 B2
(45) Date of Patent: Nov. 19, 2013

(54) ON-MACHINE MEASUREMENT METHOD AND MEASUREMENT APPARATUS (75) Inventors: Atsushi Matsubara, Kyoto (JP); Iwao Yamaji, Kyoto (JP); Daisuke Kono, Kyoto (JP); Yusuke Koike, Kyoto (JP)

(73) Assignee: Mori Seiki Co., Ltd., Nara (JP)

( * ) Notice: Subject to any disclaimer, the term of this patent is extended or adjusted under 35 U.S.C. 154(b) by 296 days.

(21) Appl. No.: 12/778,150

(22) Filed: May 12, 2010

(65) Prior Publication Data

US 2011/0015885 A1 Jan. 20, 2011

(30) Foreign Application Priority Data

Jul. 17, 2009 (JP) ................................. 2009-168925

(51) Int. Cl.
*G01R 13/00* (2006.01)
(52) U.S. Cl.
USPC .......................................................... 702/66
(58) Field of Classification Search
USPC .......................................................... 702/66
See application file for complete search history.

(56) References Cited

FOREIGN PATENT DOCUMENTS

JP 2000-298011 10/2000
JP 2000298011 A * 10/2000

OTHER PUBLICATIONS

William C. Lane, The Wave Equation and Its Solutions, Apr. 16, 2002, Retrieved from: http://liveweb.archive.org/http://www.physnet.org/modules/pdf_modules/m201.pdf.*
Yusuke Koike et al., Study on High-Accuracy On-Machine Measurement Using Triangulation-Type Laser Displacement Sensor, Proceedings of the Academic Lecture Meeting in Kansai 2009 by the Japan Society for Precision Engineering, May 13, 2009.

* cited by examiner

*Primary Examiner* — Alexander H Taningco
*Assistant Examiner* — Manuel Rivera Vargas
(74) *Attorney, Agent, or Firm* — WPAT, P.C.; Anthony King (57) ABSTRACT

A reference mirror 21 is disposed on a table 2, a first laser displacement sensor $L_1$ for measuring a machined surface of a workpiece W and a second laser displacement sensor $L_2$ for measuring a reference surface of the reference mirror 21 are disposed to a tool holder 3. A measurement motion applying section 24 causes the table 2 and the tool holder 3 to relatively move in a sinusoidal trajectory, and a sensitivity calculating section 28 calculates sensitivity of the first laser displacement sensor $L_1$ based on machined-surface displacement data and reference-surface displacement data which are measured during the relative movement. Subsequently, an actual shape data calculating section 29 corrects the machined-surface displacement data based on the calculated sensitivity, and calculates actual shape data of the machined surface by taking the difference between the corrected machined-surface displacement data and the reference-surface displacement data.

2 Claims, 5 Drawing Sheets

ON-MACHINE MEASUREMENT METHOD AND MEASUREMENT APPARATUS

TECHNICAL FIELD

The present invention relates to a method and apparatus in which, on a machine tool, a machined surface shape of a workpiece having been machined by the machine tool is measured with the workpiece attached to the machine tool after machining. More specifically, the present invention relates to an on-machine measurement method and apparatus using a non-contact laser displacement sensor as a measurement device.

BACKGROUND ART

As a method and apparatus for measuring a measurement target surface of an object to be measured by means of a non-contact laser displacement sensor, conventionally, a method and apparatus disclosed in Japanese Unexamined Patent Application Publication No. 2000-298011 have been known.

This measurement apparatus has a configuration in which two laser displacement sensors are disposed so as to face each other vertically and a measurement target object and a reference mirror are disposed between the two laser displacement sensors. The measurement target object is disposed so that a measurement target surface thereof is positioned within a measurement area of the upper laser displacement sensor, and the reference mirror is disposed so that a smooth reference surface thereof is positioned within a measurement area of the lower laser displacement sensor.

In this measurement apparatus, while the measurement target object and the reference mirror are moved simultaneously in a predetermined measurement direction, displacement of the measurement target surface of the measurement target object and displacement of the reference surface of the reference mirror are each measured by the corresponding laser displacement sensors, and the difference between the measured measurement-target-surface displacement data and the measured reference-surface displacement data is calculated and the calculated displacement data is defined as actual shape data of the measurement target surface.

In measurement using a laser displacement sensor, it is necessary to relatively move the laser displacement sensor and a measurement target object appropriately by means of a moving mechanism. However, linear motion errors (for example, an error of motion straightness or an error caused by pitching, yawing or rolling) are inherent in the moving mechanism. Therefore, if merely displacement of the measurement target surface is measured using the laser displacement sensor, the liner motion errors are added to measured data, and therefore, it is not possible to perform accurate measurement.

Accordingly, in the above conventional measurement apparatus, the smooth reference surface and the measurement target surface are measured simultaneously and a value of the difference between these displacement data is defined as actual shape data of the measurement target surface. That is, because the reference-surface displacement data reflects linear motion errors of the moving mechanism, pure displacement data (that is, shape data) of the measurement target surface can be obtained by deducting the reference-surface displacement data reflecting the linear motion errors from the measurement-target-surface displacement data to which the linear motion errors are added.

Thus, according to the above conventional measurement method and apparatus, it is possible to obtain accurate shape data from which linear motion errors are removed.

SUMMARY OF INVENTION

Technical Problem

By the way, in the field of cutting using a machine tool, in recent years, a research on so-called corrective machining in which a machined surface shape of a machined workpiece is measured on a machine tool and an error between the measured shape and a target shape is identified, and the error is corrected immediately after the identification has been carried out.

In this case, a non-contact laser displacement sensor as described above is commonly used because of its advantage that measurement can be performed at a high speed without a surface to be measured being damaged. However, because linear motion errors similar to that in the moving mechanism of the example of prior art described above are inherent in a feed mechanism, of a machine tool, which takes charge of relative movement of the laser displacement sensor and workpiece, it is necessary to remove these linear motion errors in order to obtain accurate shape data. Therefore, the measurement method and apparatus according to the above example of prior art is considered to be applicable, without any change, to such on-machine measurement.

However, in a case where a machined surface on which cutting has been performed is measured, there is a problem that a sufficiently accurate shape measurement cannot be achieved merely by removing the linear motion errors.

That is, a machined surface formed by cutting is not specular and has surface roughness caused by the cutting, and the surface of a machining mark formed by a cutting tool has an inclination. Because of the properties of the machined surface such as workpiece material as well as the surface roughness and the surface inclination, errors occur in data measured by the laser displacement sensor.

Therefore, in order to measure an accurate shape of the machined surface, an error component caused by the properties of the machined surface must be removed from data obtained by the laser displacement sensor.

The present invention has been achieved in view of the above-described circumstances, and an object of the invention is to provide an on-machine measurement method and apparatus capable of very highly accurately measure, on a machine tool, a machined surface shape of a workpiece having been machined by the machine tool.

Solution to Problem

The present invention, for achieving the above-described object, relates to an on-machine measurement method in which, in a machine tool having a table with a workpiece holding mechanism for holding a workpiece, a tool holding mechanism section for holding a tool, and a feed mechanism section for relatively moving the table and the tool holding mechanism section in a first axis direction to parallel move the table and the tool holding mechanism section, in a second axis direction, orthogonal to the first axis direction, to approximate and separate the table and the tool holding mechanism section, and in a third axis direction orthogonal to the first and second axis directions, a machined surface shape of a workpiece having been machined by the machine tool is measured on the machine tool, wherein:

a reference mirror having a specular reference surface is arranged on the table;

a first laser displacement sensor for measuring displacement of the machined surface of the workpiece and a second laser displacement sensor for measuring displacement of the reference surface of the reference mirror are arranged to the tool holding mechanism section;

the table and the tool holding mechanism section are relatively moved so as to draw a sinusoidal trajectory oscillating in the second axis direction along a scanning direction coinciding with the first axis direction, and, during the relative movement, displacement of the machined surface is measured by the first laser displacement sensor and displacement of the reference surface is measured by the second laser displacement sensor;

the obtained machined-surface displacement data and the obtained reference-surface displacement data are analyzed and sensitivity of the first laser displacement sensor is calculated, and then the machined-surface displacement data is corrected on the basis of the calculated sensitivity; and thereafter, the actual shape of the machined surface is calculated by taking the difference between the corrected machined-surface displacement data and the reference-surface displacement data.

The present invention further relates to an on-machine measurement apparatus which is provided on a machine tool having a table with a workpiece holding mechanism for holding a workpiece, a tool holding mechanism section for holding a tool, and a feed mechanism section for relatively moving the table and the tool holding mechanism section in a first axis direction to parallel move the table and the tool holding mechanism section, in a second axis direction, orthogonal to the first axis direction, to approximate and separate the table and the tool holding mechanism section, and in a third axis direction orthogonal to the first and second axis directions, and which measures a machined surface shape of a workpiece having been machined by the machine tool on the machine tool, the on-machine measurement apparatus comprising:

a reference mirror with a specular reference surface which is disposed on the table;

a first laser displacement sensor for measuring displacement of the machined surface of the workpiece and second laser displacement sensor for measuring displacement of the reference surface of the reference mirror which are disposed to the tool holding mechanism section;

a measurement motion applying section for applying, to the machine tool, a measurement motion in which the table and the tool holding mechanism section are relatively moved in a sinusoidal trajectory oscillating in the second axis direction along a scanning direction coinciding with the first axis direction;

a sensitivity calculating section for analyzing machined-surface displacement data measured by the first laser displacement sensor and reference-surface displacement data measured by the second laser displacement sensor, and calculating sensitivity of the first laser displacement sensor; and an actual shape data calculating section for correcting the machined-surface displacement data on the basis of the sensitivity of the first laser displacement sensor calculated by the sensitivity calculating section, and calculating the actual shape of the machined surface by taking the difference between the corrected machined-surface displacement data and the reference-surface displacement data.

As described above, when displacement of the machined surface of the workpiece is measured by relatively moving the laser displacement sensor and the workpiece, the obtained displacement data includes a motion error component accompanying the relative movement and an error component caused by the properties of the machined surface of the workpiece.

The inventors and others have learned that displacement data L(a) including such a motion error component and an error component caused by the properties of the machined surface can be represented by a general equation (Equation 1) given below.

$$L(a)=S_1[p(a)+e_z(a)] \quad \text{(Equation 1)}$$

Here, a is a coordinate value in the direction of the relative movement, $p(a)$ is a displacement component of the machined surface shape, and $e_z(a)$ is a displacement component caused by the motion errors. $S_1$ represents the degree of influence of error factors coming from the properties of the machined surface upon the displacement component $p(a)$ of the machined surface shape and the displacement component $e_z(a)$ caused by the motion errors, and is referred to as "sensitivity" in the present invention.

When the above general equation is applied to displacement data measured by the first laser displacement sensor, this displacement data $L_1(a)$ is represented by the following Equation 2.

$$L_1(a)=S_1[p(a)+e_z(a)] \quad \text{(Equation 2)}$$

Here, a is a coordinate value of the first axis.

In addition, displacement data $L_2(a)$ measured by the second laser displacement sensor is represented by the following Equation 3.

$$L_2(a)=e_z(a) \quad \text{(Equation 3)}$$

Consequently, the inventors and others have learned that the sensitivity of the first laser displacement sensor can be calculated by analyzing the machined-surface displacement data and reference-surface displacement data which are respectively measured by the first laser displacement sensor and the second laser displacement sensor under the measurement motion in which a sinusoidal trajectory is drawn.

They have further learned that, using the calculated sensitivity, actual shape data of the machined surface can be obtained by correcting, as Equation 4 given below, the machined-surface displacement data measured by the first laser displacement sensor, and then calculating the difference between the corrected machined-surface displacement data $L_h(a)$ and the reference-surface displacement data $L_2(a)$ measured by the second laser displacement sensor (Equation 5 given below).

$$L_h(a)=L_1(a)/S_1=p(a)+e_z(a) \quad \text{(Equation 4)}$$

$$L_h(a)-L_2(a)=[p(a)+e_z(a)]-e_z(a)=p(a) \quad \text{(Equation 5)}$$

The sensitivity $S_1$ is preferably set as follows. First, a component of the sinusoidal trajectory is separated from each of the machined-surface displacement data $L_1(a)$ and the reference-surface displacement data $L_2(a)$, and then amplitude ratio thereof is calculated and the sensitivity $S_1$ is set on the basis of the calculated amplitude ratio.

When a coordinate value of the first axis is a and a coordinate value of the second axis on the sinusoidal trajectory is $b_s(a)$, the sinusoidal trajectory is preferably defined by the Equation 6 given below.

$$b_s(a)=A \cdot \sin[2\pi(a-a_0)/\lambda_c] \quad \text{(Equation 6)}$$

Here, A is a single amplitude of the sinusoidal trajectory and $a_0$ is an initial phase. Further, $\lambda_c$ is a wavelength of the sinusoidal trajectory, and is selected from components of the fewest wavelengths in a result of a wavelength analysis performed on the machined-surface displacement data measured by the first laser displacement sensor when the table and the tool holding mechanism section are relatively moved in the scanning direction.

Advantageous Effects of Invention

According to the present invention, it is possible to measure, on a machine tool, a highly accurate machined surface shape from which motion errors accompanying relative movement of a laser displacement sensor and workpiece and errors caused by the properties of the machined surface of the workpiece are removed.

DESCRIPTION OF EMBODIMENTS

Hereinafter, a specific embodiment of the present invention will be explained with reference to the drawings.

Figure 1:
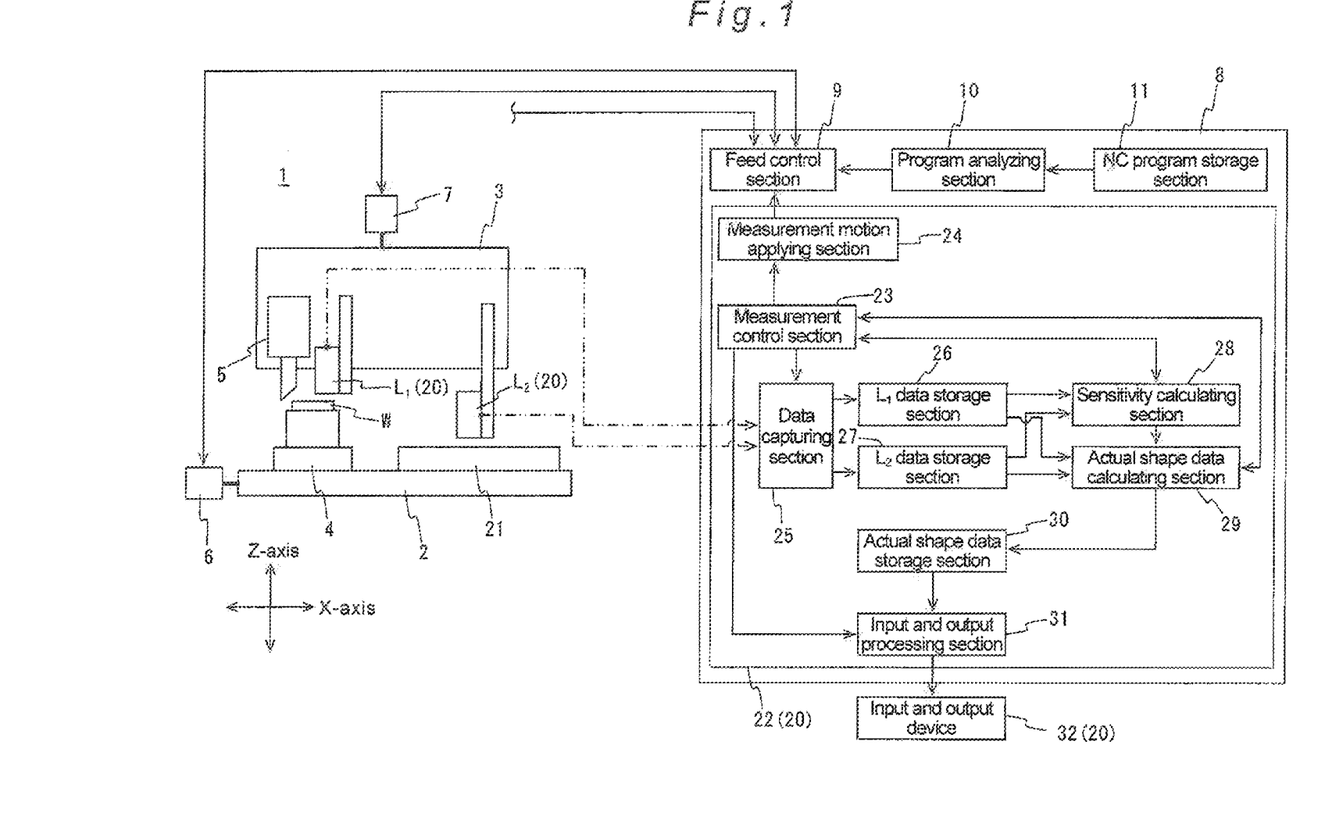
FIG. 1 is an illustration showing a configuration of an on-machine measurement apparatus according to one embodiment of the present invention.

As shown in FIG. 1, an on-machine measurement apparatus 20 of the embodiment is an apparatus which is attached to a machine tool 1 having a known configuration. Prior to a detailed explanation of the on-machine measurement apparatus 20, first of all, the machine tool 1 will be schematically described.

As shown in FIG. 1, the machine tool 1 of the embodiment has a table 2, a tool holder 3 for holding a tool 5, and a numerical controller 8. The table 2 has a workpiece holder 4 mounted on the top surface thereof for holding a workpiece W, and moves in an X-axis direction by being driven by an X-axis feed mechanism 6. The tool holder 3 is provided above the table 2 and moves in a Z-axis direction by being driven by a Z-axis feed mechanism 7. Although not particularly shown in the drawings, a Y-axis feed mechanism for relatively moving the table 2 and the tool holder 3 in a Y-axis direction orthogonal to the paper surface is provided. The numerical controller 8 has an NC program storage section 11 for storing an NC program, a program analyzing section 10 for analyzing the NC program and generating a control signal, a feed control section 9 for controlling operations of the X-axis feed mechanism 6, Y-axis feed mechanism (not shown) and Z-axis feed mechanism 7 on the basis of the generated control signal, and other components.

Thus, in the machine tool 1 having the above configuration, although it is not necessary to describe much, operations of the X-axis feed mechanism 6, Y-axis feed mechanism (not shown) and Z-axis feed mechanism 7 are appropriately controlled by the numerical controller 8, and thereby the table 2 and the tool holder 3 are appropriately moved relatively in the three orthogonal axis directions, the X-axis, Y-axis, Z-axis directions, and the workpiece W is machined by the relative movement of the table 2 and tool holder 3.

Subsequently, the on-machine measurement apparatus 20 of the embodiment will be explained in detail.

As shown in FIG. 1, the on-machine measurement apparatus 20 has a reference mirror 21 disposed on the table 2, a first and a second laser displacement sensors $L_1$, $L_2$ disposed to the tool holder 3, a measurement processing device 22 provided in the numerical controller 8, and an input and output device 32.

The reference mirror 21 has a flat and specular surface functioning as a reference surface, and is fixedly provided beside the workpiece holder 4 on the table 2 with the reference surface facing up.

The first laser displacement sensor $L_1$ and the second laser displacement sensor $L_2$ are each configured with a triangulation-type laser displacement sensor. The first laser displacement sensor $L_1$ is fixedly provided to the tool holder 3 in the vicinity of the tool 5, and measures displacement of a machined surface of the workpiece W. On the other hand, the second laser displacement sensor $L_2$ is fixedly provided to the tool holder 3 so as to face the reference mirror 21, and measures displacement of the reference surface of the reference mirror 21.

The measurement processing device 22 is configured with a measurement control section 23, a measurement motion applying section 24, a data capturing section 25, an $L_1$ data storage section 26, an $L_2$ data storage section 27, a sensitivity calculating section 28, an actual shape data calculating section 29, an actual shape data storage section 30 and an input and output processing section 31.

Figure 2:
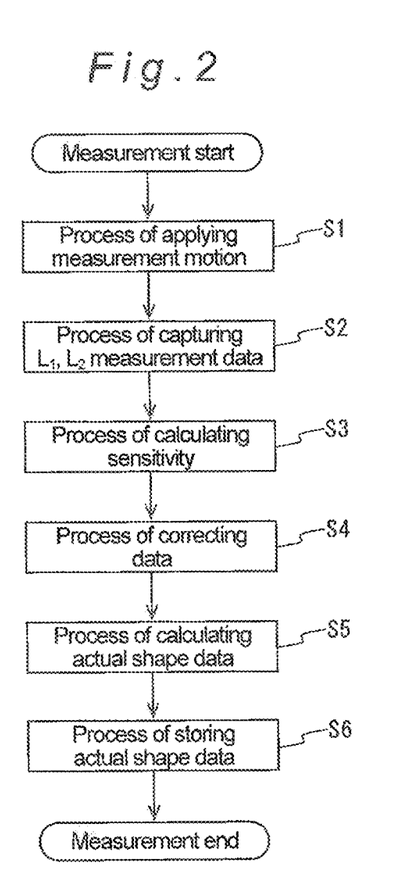
FIG. 2 is a flowchart showing processings in a measurement control section of the embodiment.

The measurement control section 23 is a processing section for totally controlling processings in the measurement motion applying section 24, in the data capturing section 25, in the sensitivity calculating section 28 and in the actual shape data calculating section 29, and executes the processings shown in FIG. 2 in turn.

The measurement motion applying section 24 is a processing section for applying, to the machine tool 1, a measurement motion in which the table 2 and the tool holder 3 are relatively moved in a sinusoidal trajectory along a predetermined measurement direction. Specifically, for example, the measurement motion applying section 24 generates such a control signal for the X-axis feed mechanism 6 and Z-axis feed mechanism 7 that the table 2 and the tool holder 3 are relatively moved while drawing a sinusoidal trajectory oscillating in the Z-axis direction along the X-axis direction, and transmits it to the feed control section 9.

Such a control signal for measurement motion is, for example, calculated according to the following Equation 7, wherein an X-axis coordinate value is x and a Z-axis coordinate value of the sinusoidal trajectory is $z_s(x)$. The measurement motion applying section 24 generates a control signal according to the Equation 7, and transmits it to the feed control section 9.

$$z_s(x) = A \cdot \sin[2\pi(x-x_0)/\lambda_c]$$ (Equation 7)

Here, A is a single amplitude of the sinusoidal trajectory, $x_0$ is a initial phase, and $\lambda_c$ is a wavelength of the sinusoidal trajectory.

The wavelength $\lambda_c$ is determined as follows. First, while the tool holder 3 is kept still and the table 2 is moved in the X-axis direction (hereinafter, this movement is referred to as a "scanning motion"), displacement of the machined surface of the workpiece W is measured by the first laser displacement sensor $L_1$. Then the obtained displacement data is Fourier-transformed and a wavelength analysis is performed thereon, and the wavelength $\lambda_c$ is selected from components of the fewest wavelengths in the results of the analysis. By setting the wavelength $\lambda_c$ to a wavelength which is included neither in the machined surface shape of the workpiece nor in the motion errors, a sinusoidal component of wavelength $\lambda_c$ can be separated accurately. Thereby, it is possible to accurately calculate sensitivity $S_1$.

In this connection, provided that the machined-surface displacement data and the reference-surface displacement data which are respectively measured by the first laser displacement sensor $L_1$ and the second laser displacement sensor $L_2$ through the scanning motion are $L_1(x)$ and $L_2(x)$, respectively, $L_1(x)$ and $L_2(x)$ are represented by the following Equations 8 and 9.

$$L_1(x) = S_1[p(x) + e_z(x)]$$ (Equation 8)

$$L_2(x) = e_z(x)$$ (Equation 9)

Here, p(x) represents the machined surface shape and $e_z(x)$ represents a Z-axis component of a linear motion error.

Further, the single amplitude A and the initial phase $x_0$ are appropriately set so as to satisfy the following Equations 10 and 11.

$$\max[L_1(x) + z_s(x)] = d_{max}$$ (Equation 10)

$$\min[L_1(x) + z_s(x)] = d_{min}$$ (Equation 11)

Here, $[d_{min}, d_{max}]$ is a measurement range which is appropriately set to prevent a linear error of the first laser displacement sensor $L_1$ from being large.

Figure 3:
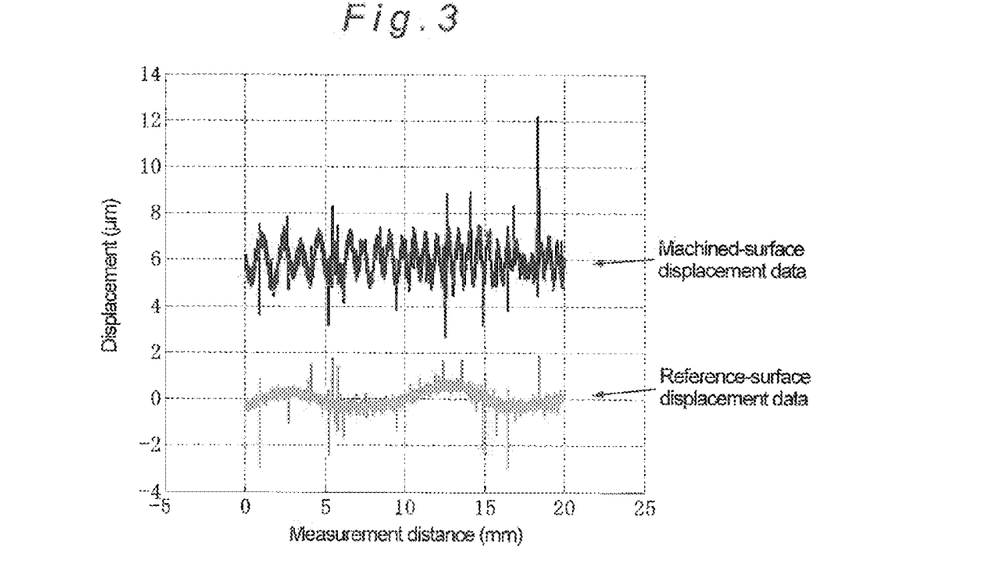
FIG. 3 is a signal waveform diagram showing machined-surface displacement data and reference-surface displacement data which are respectively measured by a first laser displacement sensor and a second laser displacement sensor thorough a scanning motion.

Here, examples of the machined-surface displacement data $L_1(x)$ and reference-surface displacement data $L_2(x)$ which are respectively measured by the first laser displacement sensor $L_1$ and the second laser displacement sensor $L_2$ through the scanning motion are shown in FIG. 3.

The reference-surface displacement data $L_2(x)$ shown in FIG. 3 represents a waveform in which a motion error component (low frequency component) of the X-axis feed mechanism 6 is added to a displacement component of the reference surface. The machined-surface displacement data $L_1(x)$ represents a complex waveform in which a linear motion error component (low frequency component) of the X-axis feed mechanism 6 and an error component relating to the surface properties of the machined surface are added to a displacement component of the machined surface.

Figure 4:
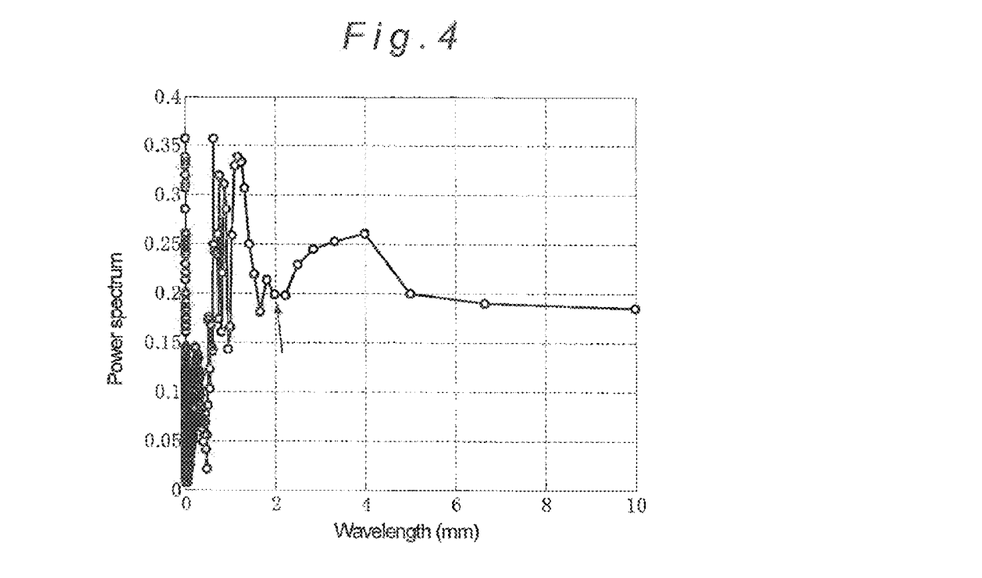
FIG. 4 shows a power spectrum in which the machined-surface displacement data shown in FIG. 3 is Fourier-transformed and a wavelength analysis is performed thereon.

FIG. 4 shows a power spectrum in which the machined-surface displacement data $L_1(x)$ shown in FIG. 3 is Fourier-transformed and a wavelength analysis is performed thereon. In this case, since a component having a wavelength of 2 mm which is indicated by an arrow in the figure is the fewest component, $\lambda_c$ in the above Equation 7 is set to 2 mm.

While the measurement motion is performed, the data capturing section 25 executes a processing for capturing the displacement data (machined-surface displacement data) $L_1(x)$ output from the first laser displacement sensor $L_1$ and storing it in the $L_1$ data storage section 26, and similarly, capturing the displacement data (reference-surface displacement data) $L_2(x)$ output from the second laser displacement sensor $L_2$ and storing it in the $L_2$ data storage section 27.

Figure 5:
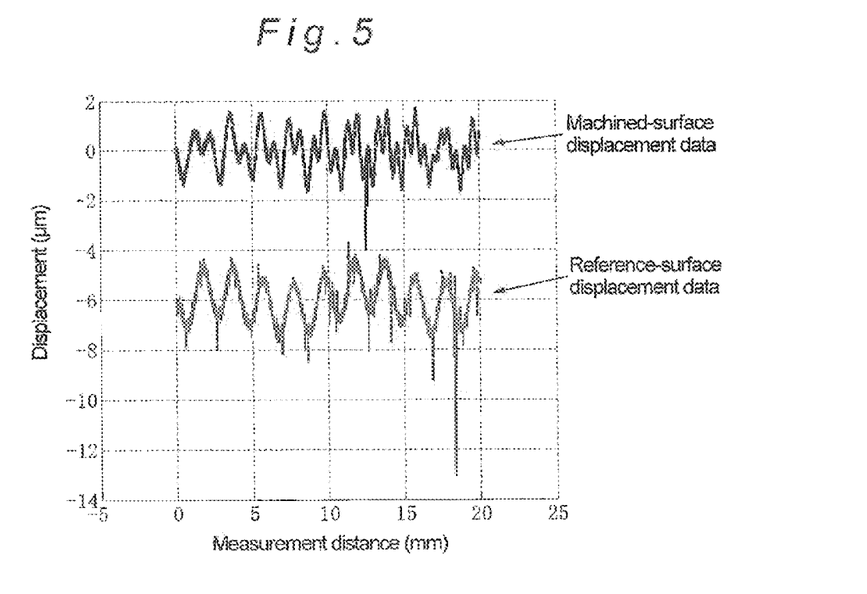
FIG. 5 is a signal waveform diagram showing the machined-surface displacement data and reference-surface displacement data which are respectively measured by the first laser displacement sensor and the second laser displacement sensor under a measurement motion in which a sinusoidal trajectory is drawn.

Here, as an example, FIG. 5 shows the machined-surface displacement data $L_1(x)$ and the reference-surface displacement data $L_2(x)$ which are respectively measured by the first laser displacement sensor $L_1$ and the second laser displacement sensor $L_2$ in a case where a measurement motion obeying the above Equation 7 which is set on the condition that $\lambda_c$ in the Equation 7 is 2 mm and $[d_{min}, d_{max}]$ (measurement range) in the Equations 10 and 11 is $[-2 \mu m, +2 \mu m]$ is applied to the machine tool 1.

The sensitivity calculating section 28 reads out the machined-surface displacement data $L_1(x)$ and the reference-surface displacement data $L_2(x)$ from the $L_1$ data storage section 26 and the $L_2$ data storage section 27, respectively, separates a sinusoidal component of wavelength $\lambda_c$ from each of them, and determines the sensitivity $S_1$ in the above Equation 8 by calculating amplitude ratio thereof.

The actual shape data calculating section 29 reads out the machined-surface displacement data $L_1(x)$ and the reference-surface displacement data $L_2(x)$ from the $L_1$ data storage section 26 and the $L_2$ data storage section 27, respectively, and calculates corrected displacement data $L_h(x)$ by correcting the machined-surface displacement data $L_1(x)$ according to the following Equation 12 using the sensitivity $S_1$ calculated by the sensitivity calculating section 28. Then the actual shape data calculating section 29 calculates actual shape data of the machined surface p(x) from the obtained corrected displacement data $L_h(x)$ and the reference-surface displacement data $L_2(x)$ according to the following Equation 13, and stores it in the actual shape data storage section 30.

$$L_h(x) = L_1(x)/S_1$$ (Equation 12)

$$p(x) = L_h(x) - L_2(x)$$ (Equation 13)

Further, the input and output processing section 31 receives a measurement start signal input from the input and output device 32 and transmits it to the measurement control section 23, and receives an output request from the input and output device 32 and outputs the data stored in the $L_1$ data storage section 26, in the $L_2$ data storage section 27 and in the actual shape data storage section 30 to the input and output device 32.

According to the on-machine measurement apparatus 20 of the embodiment configured as described above, first a measurement start signal is input from the input and output device 32 and is transmitted to the measurement control section 23, and thereby an on-machine measurement is started. It is assumed that that a workpiece W is held by the workpiece holder 4 and the top surface of the workpiece W has been machined by the tool 5.

When the measurement start signal is transmitted to the measurement control section 23, the measurement control section 23 executes the processings shown in FIG. 2 in turn.

That is, first in Step S1, the measurement motion applying section 24 transmits a control signal for measurement motion to the feed control section 9, and thereby causes the table 2 and the tool holder 3 to perform a measurement motion.

Subsequently, while the measurement motion is performed, the data capturing section 25 captures machined-surface displacement data $L_1(x)$ output from the first laser displacement sensor $L_1$ and reference-surface displacement data $L_2(x)$ output from the second laser displacement sensor $L_2$, and stores them in the $L_1$ data storage section 26 and the $L_2$ data storage section 27, respectively (Step S2).

Next, the sensitivity calculating section 28 reads out the machined-surface displacement data $L_1(x)$ and the reference-surface displacement data $L_2(x)$ from the $L_1$ data storage section 26 and the $L_2$ data storage section 27, respectively, and separates a sinusoidal component of wavelength $\lambda_c$ from each of them and calculates sensitivity $S_1$ from amplitude ratio thereof (Step S3).

Thereafter, the actual shape data calculating section 29 corrects the machined-surface displacement data $L_1(x)$ on the basis of the calculated sensitivity $S_1$ (Step S4), calculates actual shape data of the machined surface p(x) by taking the difference between the corrected displacement data $L_h(x)$ and the reference-surface displacement data $L_2(x)$ (Step S5), and stores the calculated actual shape data p(x) in the actual shape data storage section 30 (Step S6). Then the series of processings is terminated.

Figure 6:
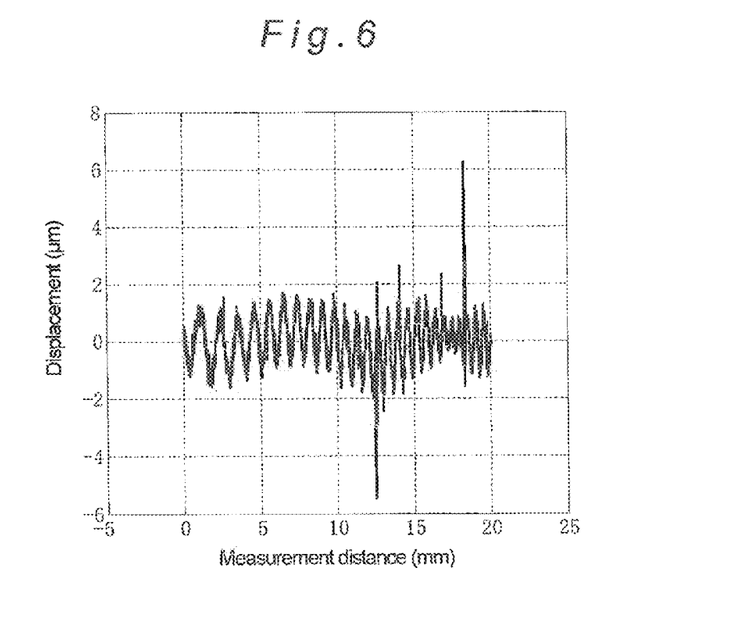
FIG. 6 is a signal waveform diagram of actual shape data of the machined surface calculated according to the embodiment.

Here, the actual shape data of the machined surface p(x) which is calculated by executing the processings in the above Steps S3 to S5 on the basis of the machined-surface displacement data $L_1(x)$ and reference-surface displacement data $L_2(x)$ shown in FIG. 5 is shown in FIG. 6 as an example of the embodiment.

Figure 7:
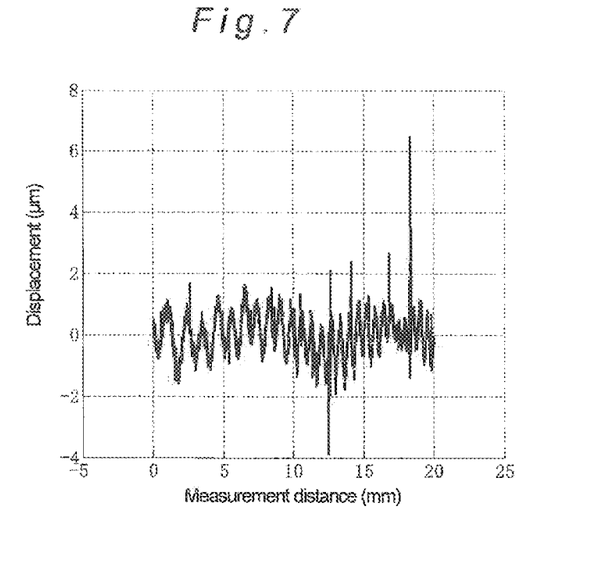
FIG. 7 is a signal wave diagram in which the difference between the machined-surface displacement data and reference-surface displacement data measured through the scanning motion which are shown in FIG. 3 is taken.

Further, as a comparative example corresponding to an example of prior art, FIG. 7 shows data in which the difference between the machined-surface displacement data $L_1(x)$ and reference-surface displacement data $L_2(x)$ measured by the scanning motion, which are shown in FIG. 3, is taken.

Figure 8:
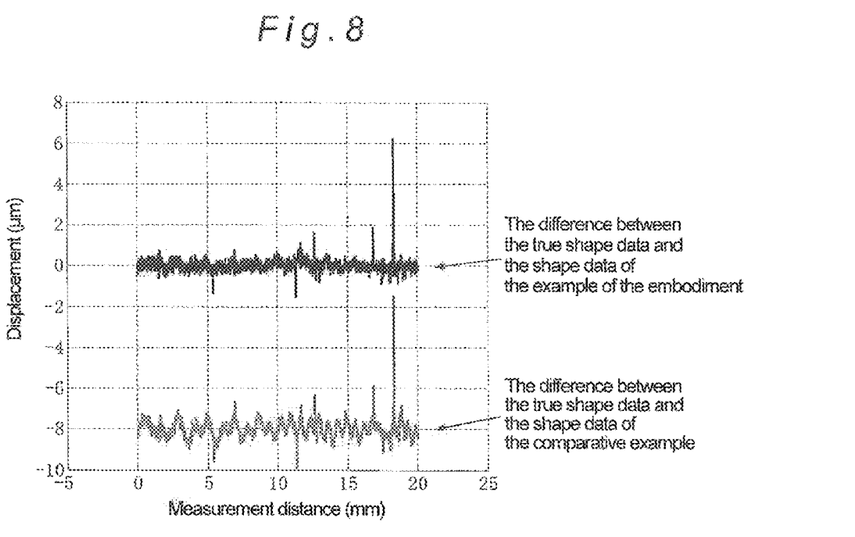
FIG. 8 is an illustration for explaining an effect of the embodiment.

Furthermore, FIG. 8 shows the results of a calculation in which first the workpiece W, which is a sample target, is detached from the machine tool 1, and the shape of the machined surface of the workpiece W is measured by a precise shape measurement device which hardly includes errors, and then the difference between the obtained shape data (true shape data) and the shape data of the example of the embodiment shown in FIG. 6 and the difference between the obtained shape data (true shape data) and the shape data of the comparative example shown in FIG. 7 are calculated.

As described above, when displacement of the machined surface of the workpiece is measured by relatively moving the laser displacement sensor and the workpiece, the obtained displacement data includes a motion error component accompanying the relative movement and an error component caused by the properties of the machined surface of the workpiece. Therefore, if only the motion error component is removed like the example of prior art, it is not possible to calculate an accurate machined surface shape.

According to the embodiment, since it is possible to remove both of the motion error component and the error component caused by the properties of the machined surface of the workpiece, it is possible to measure, on the machine tool, a very highly accurate machined surface shape. This is obvious from FIG. 8. That is, the shape data of the machined surface shown as an example of the embodiment is hardly different from the true shape data, and the shape data of the machined surface shown as a comparative example, however, includes large errors with respect to the true shape data. Therefore, it is understood that the embodiment enables a machined surface shape to be measured highly accurately.

Thus, one embodiment of the present invention has been explained. However, a specific mode in which the present invention can be realized is not limited to the above embodiment.

INDUSTRIAL APPLICABILITY

The present invention can be advantageously used in the field of machining by a machine tool.

REFERENCE SIGNS LIST

1 Machine tool
2 Table
3 Tool holder
4 Workpiece holder
20 On-machine measurement apparatus
21 Reference mirror
22 Measurement processing device
23 Measurement control section
24 Measurement motion applying section
25 Data capturing section
26 $L_1$ data storage section
27 $L_2$ data storage section
28 Sensitivity calculating section
29 Actual shape data calculating section
30 Actual shape data storage section
$L_1$ First laser displacement sensor
$L_2$ Second laser displacement sensor
W Workpiece

CITATION LIST

Patent Literature

Japanese Unexamined Patent Application Publication No. 2000-298011

What is claimed is:

1. An on-machine measurement method in which a machined surface shape of a workpiece machined by a machine tool is measured on the machine tool, the machine tool having a table with a workpiece holding mechanism for holding a workpiece, a tool holding mechanism section for holding a tool, and a feed mechanism section for relatively moving the table and the tool holding mechanism section in a first axis direction to parallel move the table and the tool holding mechanism section relative to each other, in a second axis direction, orthogonal to the first axis direction, to approximate and separate the table and the tool holding mechanism section, and in a third axis direction orthogonal to the first and second axis directions, comprising:
arranging a reference mirror having a specular reference surface on the table;
arranging a first laser displacement sensor for measuring displacement of the machined surface of the workpiece and a second laser displacement sensor for measuring displacement of the reference surface of the reference mirror on the tool holding mechanism section;
driving the table and the tool holding mechanism section in the first direction and the second direction by the feed mechanism section and thereby relatively moving the table and the tool holding mechanism section so as to draw a sinusoidal trajectory oscillating in the second axis direction along a scanning direction coinciding with the first axis direction, and
measuring displacement of the machined surface by the first laser displacement sensor and measuring displacement of the reference surface by the second laser displacement sensor during the relative movement of the table and the tool holding mechanism section;
analyzing the obtained machined-surface displacement data and the obtained reference-surface displacement data to calculate sensitivity of the first laser displacement sensor and then correcting the machined-surface displacement data on the basis of the calculated sensitivity; and calculating the actual shape of the machined surface by taking the difference between the corrected machined-surface displacement data and the reference-surface displacement data, wherein:

the sensitivity represents the degree of influence of error factors caused by the machined surface upon a displacement component coming from the machined surface shape and a displacement component coming from movement errors of the feed mechanism section, the displacement components being included in the machined-surface displacement data;

a component of the sinusoidal trajectory is separated from each of the machined-surface displacement data and the reference-surface displacement data, and then an amplitude ratio thereof is calculated and the sensitivity is set on the basis of the calculated amplitude ratio;

the sinusoidal trajectory is defined by an equation:

$$b_s(a) = A \cdot \sin[2\pi(a-a_0)/\lambda_c]$$

when a coordinate value of the first axis is a and a coordinate value of the second axis on the sinusoidal trajectory is $b_s(a)$;

A is a single amplitude of the sinusoidal trajectory and $a_0$ is an initial phase; and $\lambda_c$ is a wavelength of the sinusoidal trajectory and is a wavelength which is selected from components of the fewest wavelengths in results of a wavelength analysis performed on the machined-surface displacement data which is measured by the first laser displacement sensor while the table and the tool holding mechanism section are relatively moved in the scanning direction.

2. An one-machine measurement apparatus which is provided on a machine tool having a table with a workpiece holding mechanism for holding a workpiece, a tool holding mechanism section for holding a tool, and a feed mechanism section for relatively moving the table and the tool holding mechanism section in a first axis direction to parallel move the table and the tool holding mechanism section, in a second axis direction, orthogonal to the first axis direction, to approximate and separate the table and the tool holding mechanism section, and in a third axis direction orthogonal to the first and second axis directions, and which measures a machined surface shape of a workpiece having been machined by the machine tool on the machine tool, the on-machine measurement apparatus comprising:

a reference mirror with a specular reference surface which is disposed on the table;

a first laser displacement sensor for measuring displacement of the machined surface of the workpiece and second laser displacement sensor for measuring displacement of the reference surface of the reference minor which are disposed to the tool holding mechanism section;

a measurement motion applying section for applying, to the machine tool, a measurement motion in which the table and the tool holding mechanism section are driven in the first direction and the second direction by the feed mechanism section and relatively moved in a sinusoidal trajectory oscillating in the second axis direction along a scanning direction coinciding with the first axis direction;

a sensitivity calculating section for analyzing machined-surface displacement data measured by the first laser displacement sensor and reference-surface displacement data measured by the second laser displacement sensor, and calculating sensitivity of the first laser displacement sensor; and an actual shape data calculating section for correcting the machined-surface displacement data on the basis of the sensitivity of the first laser displacement sensor calculated by the sensitivity calculating section, and calculating the actual shape of the machined surface by taking the difference between the corrected machined-surface displacement data and the reference-surface displacement data, wherein:

the sensitivity represents the degree of influence of error factors caused by the machined surface upon a displacement component coming from the machined surface shape and a displacement component coming from movement errors of the feed mechanism section, the displacement components being included in the machined-surface displacement data;

a component of the sinusoidal trajectory is separated from each of the machined-surface displacement data and the reference-surface displacement data, and then an amplitude ratio thereof is calculated and the sensitivity is set on the basis of the calculated amplitude ratio;

the sinusoidal trajectory is defined by an equation:

$$b_s(a) = A \cdot \sin[2\pi(a-a_0)/\lambda_c]$$

when a coordinate value of the first axis is a and a coordinate value of the second axis on the sinusoidal trajectory is $b_s(a)$;

A is a single amplitude of the sinusoidal trajectory and $a_0$ is an initial phase; and $\lambda_c$ is a wavelength of the sinusoidal trajectory and is a wavelength which is selected from components of the fewest wavelengths in results of a wavelength analysis performed on the machined-surface displacement data which is measured by the first laser displacement sensor while the table and the tool holding mechanism section are relatively moved in the scanning direction.

* * * * *